United States Patent [19]
Gagnon

[11] Patent Number: 5,398,978
[45] Date of Patent: Mar. 21, 1995

[54] ADJUSTABLE COUPLING FOR LINKING CONDUITS

[75] Inventor: Michel Gagnon, Pierrefonds, Canada

[73] Assignee: Henlex Inc., Montreal, Canada

[21] Appl. No.: 160,588

[22] Filed: Dec. 2, 1993

[51] Int. Cl.6 .......................................... F16L 27/00
[52] U.S. Cl. ................................. 285/184; 285/185; 403/145; 403/91
[58] Field of Search ............... 285/184, 185; 403/145, 403/146, 148, 91, 87, 110

[56] References Cited

U.S. PATENT DOCUMENTS

| | | | |
|---|---|---|---|
| 2,024,930 | 12/1935 | Judell | 285/185 |
| 2,188,069 | 1/1940 | Walsh | 285/185 |
| 2,255,262 | 9/1941 | MacFadden | 285/185 |
| 2,621,882 | 12/1952 | Fletcher | 285/185 |
| 2,831,709 | 4/1958 | Shaw et al. | 285/185 |
| 2,931,672 | 4/1960 | Merritt et al. | 285/160 |
| 3,030,128 | 4/1962 | Versen | 285/185 |
| 3,322,886 | 5/1967 | Warshawsky | 403/146 |
| 3,409,315 | 11/1968 | Wichers et al. | 285/185 |
| 4,035,004 | 7/1977 | Hengesbach | 285/166 |
| 4,180,285 | 12/1979 | Reneau | 285/261 |
| 4,582,445 | 4/1986 | Warshawsky | 403/146 |
| 4,946,202 | 8/1990 | Perricone | 285/166 |
| 5,036,754 | 8/1991 | Simms et al. | 98/115.4 |
| 5,116,223 | 5/1992 | Chung | 433/79 |
| 5,125,939 | 6/1992 | Karlsson | 55/316 |
| 5,133,691 | 7/1992 | Karlsson | 454/56 |
| 5,159,737 | 11/1992 | Kimura et al. | 15/314 |
| 5,275,444 | 1/1994 | Wytnoff | 285/185 |

Primary Examiner—Eric K. Nicholson
Attorney, Agent, or Firm—Merchant & Gould, Smith, Edell, Welter & Schmidt

[57] ABSTRACT

The coupling is provided for linking and supporting conduits hanging above the ground and is adjustable by means of a hand-operatable nut modifying the contact friction between flat and circular edges of two hollow casings. The nut is in mesh with an axle extending through both casings and urges a spring against an axial bearing that rests on one of the casings.

16 Claims, 5 Drawing Sheets

ADJUSTABLE COUPLING FOR LINKING CONDUITS

FIELD OF THE INVENTION

The present invention relates to an adjustable coupling for linking conduits, more particularly a coupling adjustable by means of a nut modifying the contact friction between two casings for supporting the conduits hanging above the ground.

BACKGROUND OF THE INVENTION

Couplings for linking conduits are particularly suitable for the construction of movable arm systems, more particularly systems where fluids, such as air under vacuum, are convoyed by the conduits hanging above the ground. In such systems, the couplings are a key element because the versatility of the systems depends upon the adjustability of the arms and the maximum weight that can be put at their free end.

The main drawback of the couplings of the prior art systems is that they are difficult to adjust and that fine adjustments are often altered after a short period of time, thereby making the systems unstable and tending to fall. Additionally, the length of the conduits cannot be changed because the couplings are designed to be used under specific load conditions. Counterbalance is usually provided inside the conduits by means of springs extending along the conduits and they are difficult to replace.

In some other couplings, the link between the interior of the conduits is a flexible tube, which usually has a large diameter that cannot withstand high thermic loads or high vacuum pressure.

SUMMARY OF THE INVENTION

The object of the present invention is to provide an adjustable coupling that can be easily adjusted and can accept modifications of the weight loads.

More particularly, it is an object of the present invention to provide an adjustable coupling for linking two conduits, the coupling comprising:

- a first and a second hollow casing, each having an open face comprising a substantially flat and circular edge, the edges being juxtaposed in a slip fitting contact for allowing relative rotation of the casings around a rotation axis;
- an axle substantially coinciding with the rotation axis, the axle being securable to the first casing for preventing relative rotation and axial inward movement thereof with reference to the first casing, the second casing having a hole through which a threaded free end of the axle projects;
- a trust bearing inserted around the free end of the axle;
- a helicoidal spring inserted around the free end of the axle;
- a nut in mesh with the free end of the axle and urging the spring and the trust bearing towards the second casing, the nut being rotatable for modifying the friction of the contact between the edges; and
- connecting means for substantially laterally connecting the first and second casings to a corresponding conduit.

A non restrictive description of a preferred embodiment will now be given with reference to the appended drawings.

DESCRIPTION OF A PREFERRED EMBODIMENT

Figure 1:
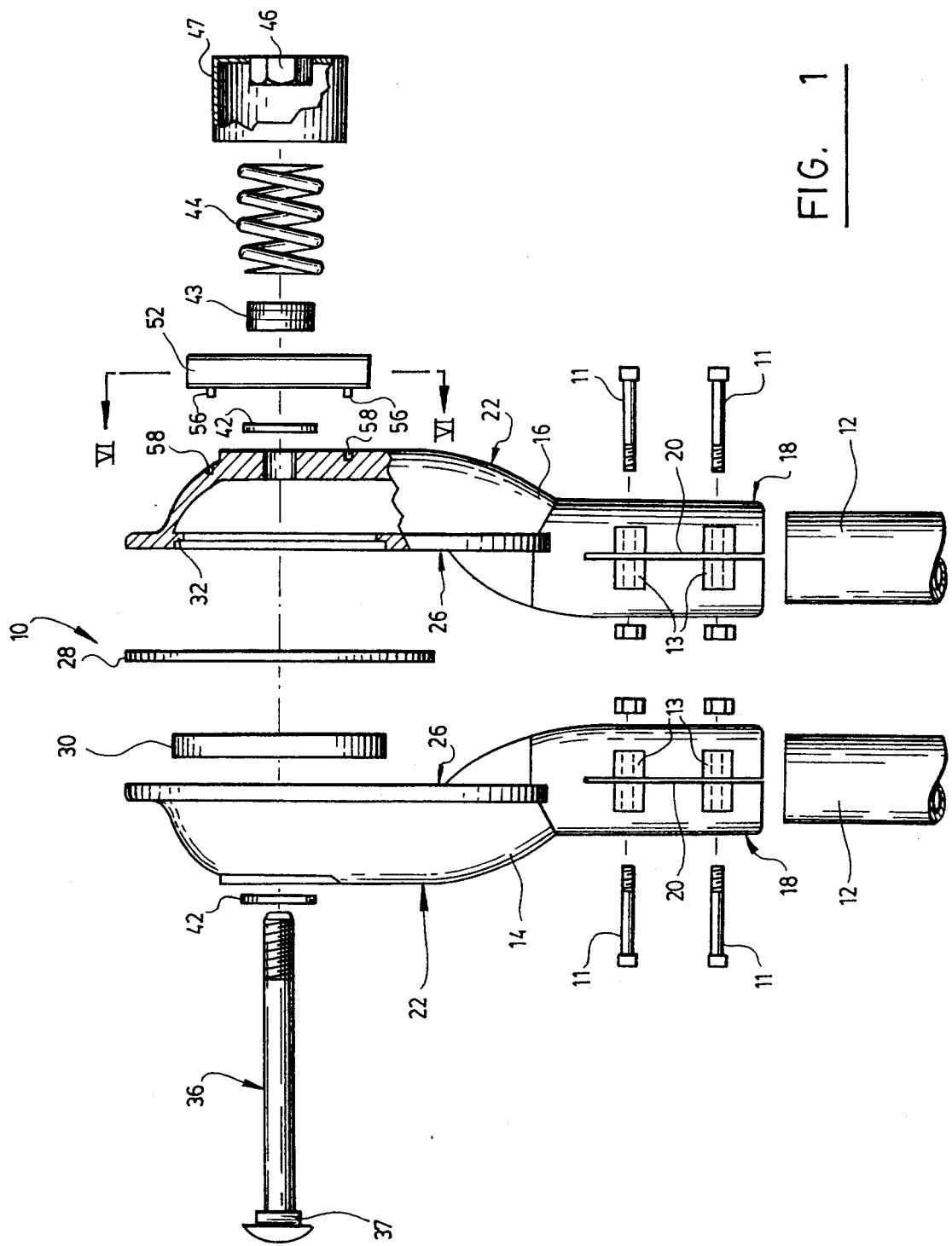
FIG. 1 is an exploded view of the coupling, according to a preferred embodiment of the present invention.
Figure 2:
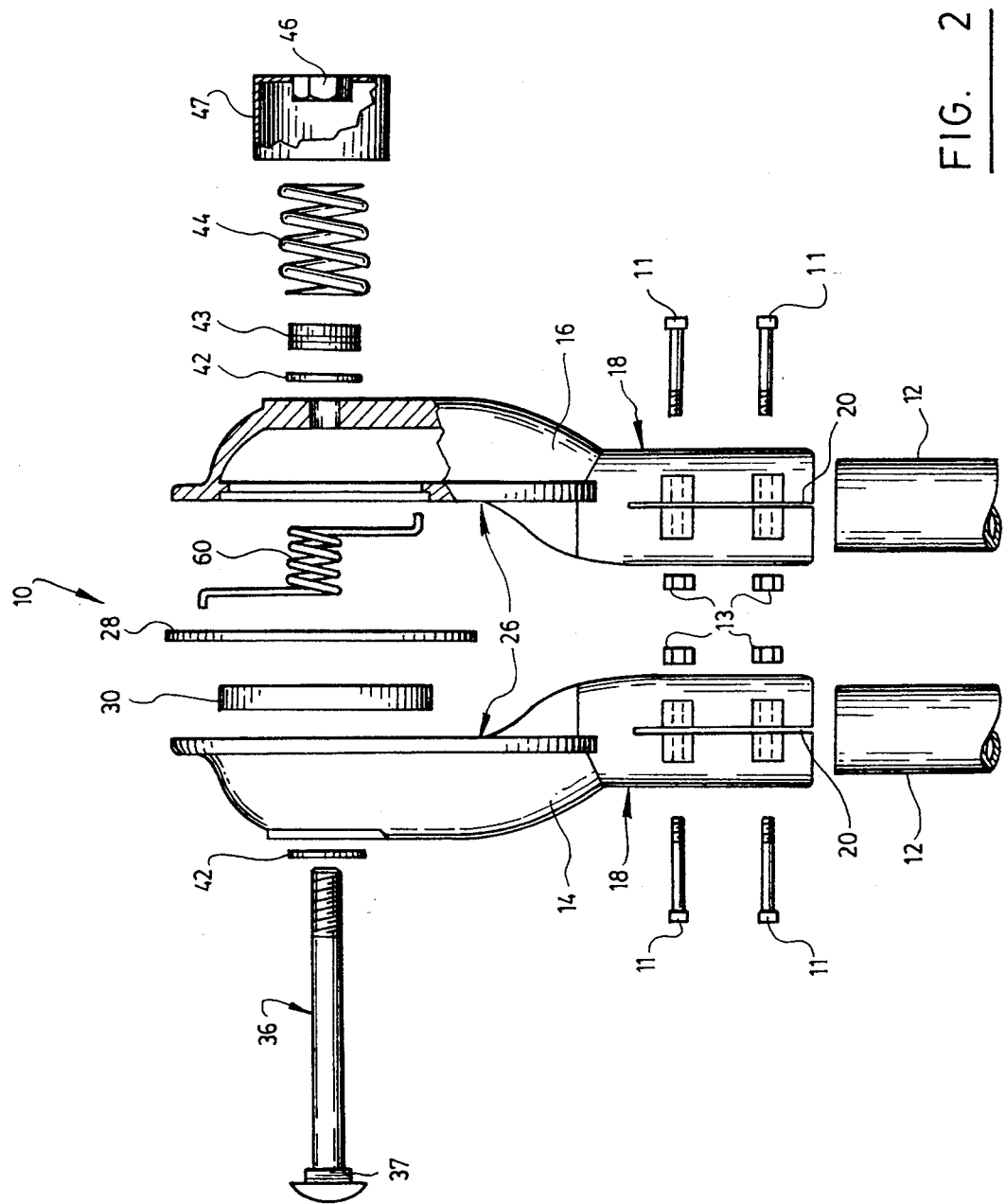
FIG. 2 is an exploded view of the coupling, according to another preferred embodiment of the present invention.

Referring to FIGS. 1 and 2, there is shown an adjustable coupling 10 for linking two conduits 12, according to the present invention. The coupling 10 comprises a first hollow casing 14 and a second hollow casing 16, both substantially identical and respectively sidely connected to one conduit 12 so that the interior of each conduit 12 is communicating with the other.

The connection between the conduits 12 and the corresponding casing 14 or 16 is preferably a sleeve portion 18, sidely projecting from each casing 14 or 16, in which one of the ends of the corresponding conduit 12 is inserted. In the preferred embodiment, two opposite longitudinal slots 20 are provided along each sleeve portion 18 for allowing easier insertion of the end of the corresponding conduit 12. The sleeve portions 18 are tightened on their corresponding conduit 12 by means of screws 11 inserted in knobs 13 radially protruding from the sleeve portions 18 on each side of the slots 20. Of course, an alternative type of connection may be used. As for the word "sidely", it should be understood that, in use, the coupling 10 allows the conduits 12 to be substantially aligned with each other.

Figure 3:
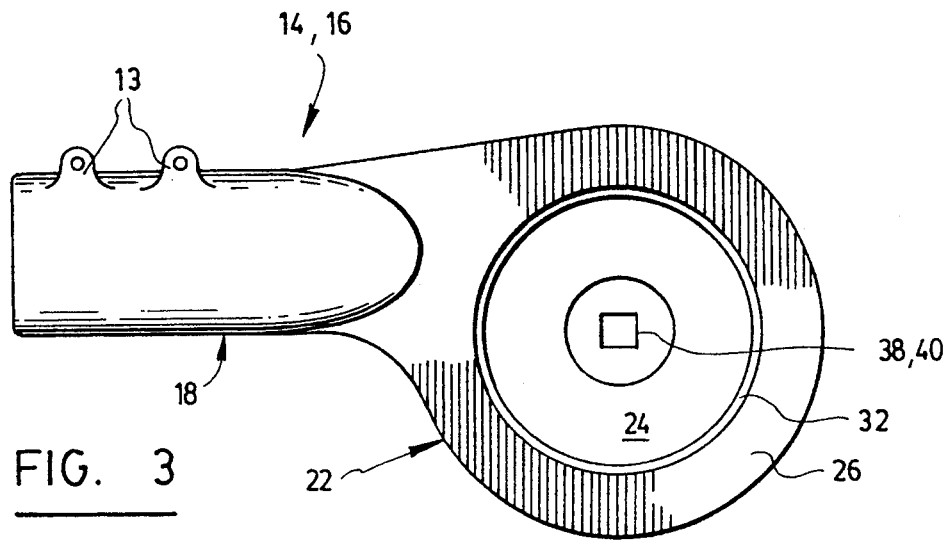
FIG. 3 is a top plan view of one of the casings of FIGS. 1 and 2.
Figure 4:
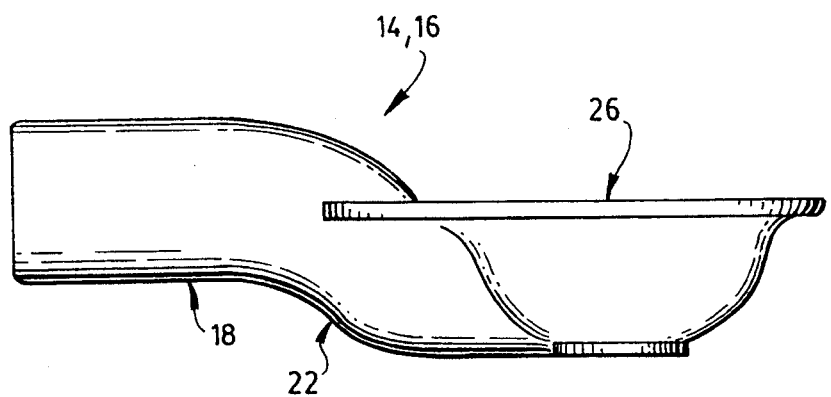
FIG. 4 is a side elevational view of the casing of FIG. 3.
Figure 5:
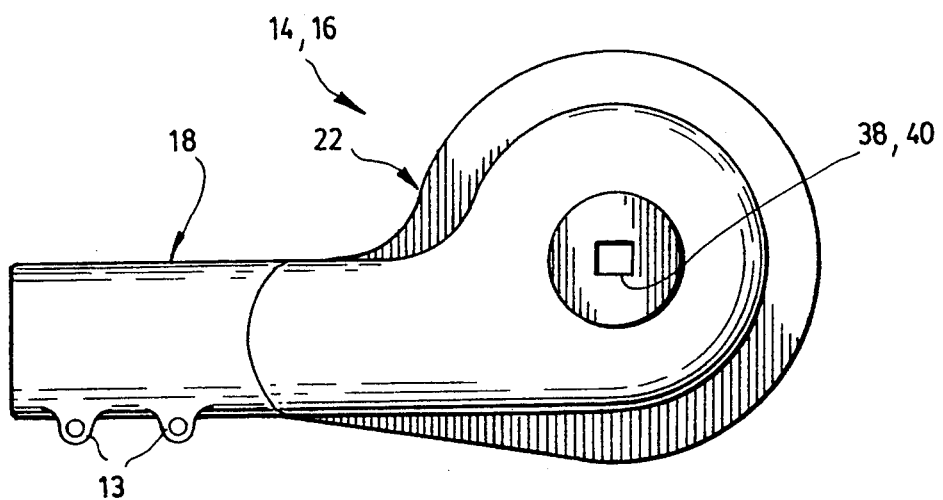
FIG. 5 is a bottom plan view of the casing of FIG. 3.

Referring to FIGS. 3 to 5, each casing 14 and 16 comprises a substantially bell-shaped or pan-shaped portion 22 having an open face 24. The open face 24 comprises a substantially flat and circular edge 26 which is, in use, juxtaposed in a slip fitting contact with the edge 26 of the other casing. When both edges 26 are juxtaposed, they become the contact points between the casings 14 and 16 while allowing rotation around a rotation axis concentric with the edges 26. Optionally, a friction disk 28 (FIGS. 1 and 2) is located between the edges 26 for preventing them from wearing off and to provide a better friction control since disks 28 with various friction coefficients may be chosen according to the design requirements. The friction disk 28 may also contribute to seal the junction between the edges 26 if the interior of the coupling 10 is under vacuum or under pressure.

Referring back to FIGS. 1 and 2, there is shown an alignment ring 30 preferably inserted in both casings 14 and 16 so that relative rotation between them may be according to a circular path. One part of the ring 30 is insertable in a first circular slot 32 provided on the edge 26 of the casing 14, and a second part thereof is insertable in a second circular slot 32 provided on the edge 26 of the casing 16. Both slots face each other and are substantially identical. Of course, the ring 30 may be rigidly attached to one of the casings 14 and 16.

To bind the casings 14 and 16 together, an axle 36 extending through both of them is provided. The axle 36 is substantially coinciding with the rotation axis concentric with the edges 26. The axle 36, which may be in tile form of an elongated bolt, has one end preferably secured to the casing 14 for preventing relative rotation and axial inward movement thereof with reference to casing 14. This is due, on one hand, to the traction that will be exerted for keeping the casings 14 and 16 together and, on the other hand, on the fact that the axle 36 has to be rotatively fixed with reference to at least one of the casings 14 and 16. In the preferred embodiment, the axle 36 is a bolt having an end with a square cross-section 37 that is inserted in a square hole 38 provided in the casing 14 (see FIGS. 3 and 5). Of course, the axle 36 may also be a bolt welded to the interior of the casing 14 and projecting towards the casing 16, or vice versa. The casing 16 has a hole 40 through which a threaded free end of the axle 36 projects when the coupling 10 is assembled (see FIGS. 3 and 5).

If the interior of the coupling 10 is to be under vacuum or under pressure, sealing rings 42 may be provided for reducing the leaks. Of course, any other suitable sealing means giving similar results may be used.

As aforesaid, once the axle 36 is installed, the threaded free end thereof projects from the hole 40. A trust bearing 43 is then inserted around the free end. This trust bearing 43 is an axial bearing and is juxtaposed to the casing 16. After the trust bearing 43 is a helicoidal spring 44 inserted around the free end and juxtaposed to the trust bearing 43. A nut 46 in mesh with the free end is juxtaposed to the spring 44. In the present description and the appended claims, the verb "juxtaposed" means that they are close to the related element, but not necessarily in direct contact with it. The order of the trust bearing 43 and the spring 44 may be changed.

Upon rotation of the nut 46, the binding force holding the casings 14 and 16 together is modified, which then modifies by return the friction of the contact between the edges 26. This force transits through the spring 44 and the trust bearing 43. Preferably, the nut 46 is located at the bottom of a hand-operatable cup-shaped element 47. The element 47 is preferably inwardly mounted on the coupling 10 for covering the spring 44. This allows a greater holding surface for hand operation.

The main advantage of the above-described construction is that fine adjustment of the friction is possible because the spring 44 is modulating the force thereof. Additionally, the presence of the trust bearing 43 allows the coupling 10 to be oriented without affecting the setting of the friction. Finally, the spring 44 acts as a lock washer for substantially preventing the nut 46 to become loose.

Figure 6:
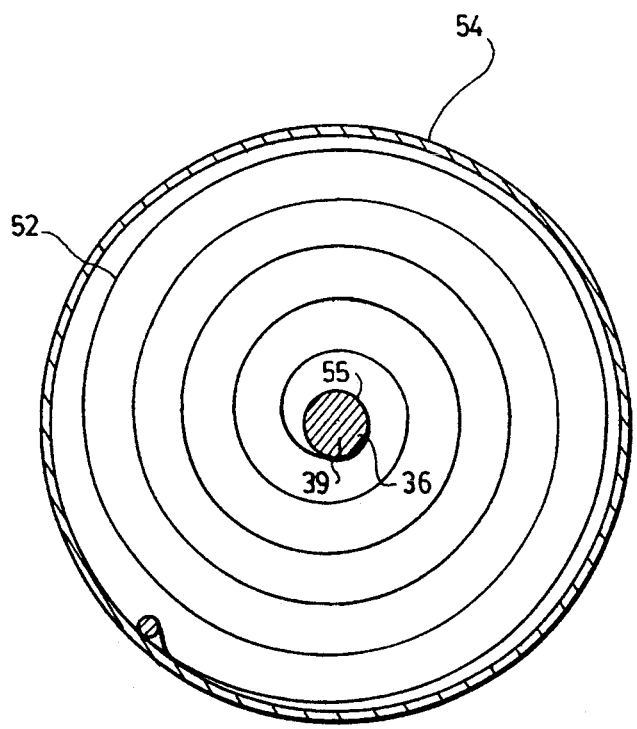
FIG. 6 is a cross-sectional view according to line VI—VI in FIG. 1.
Figure 7:
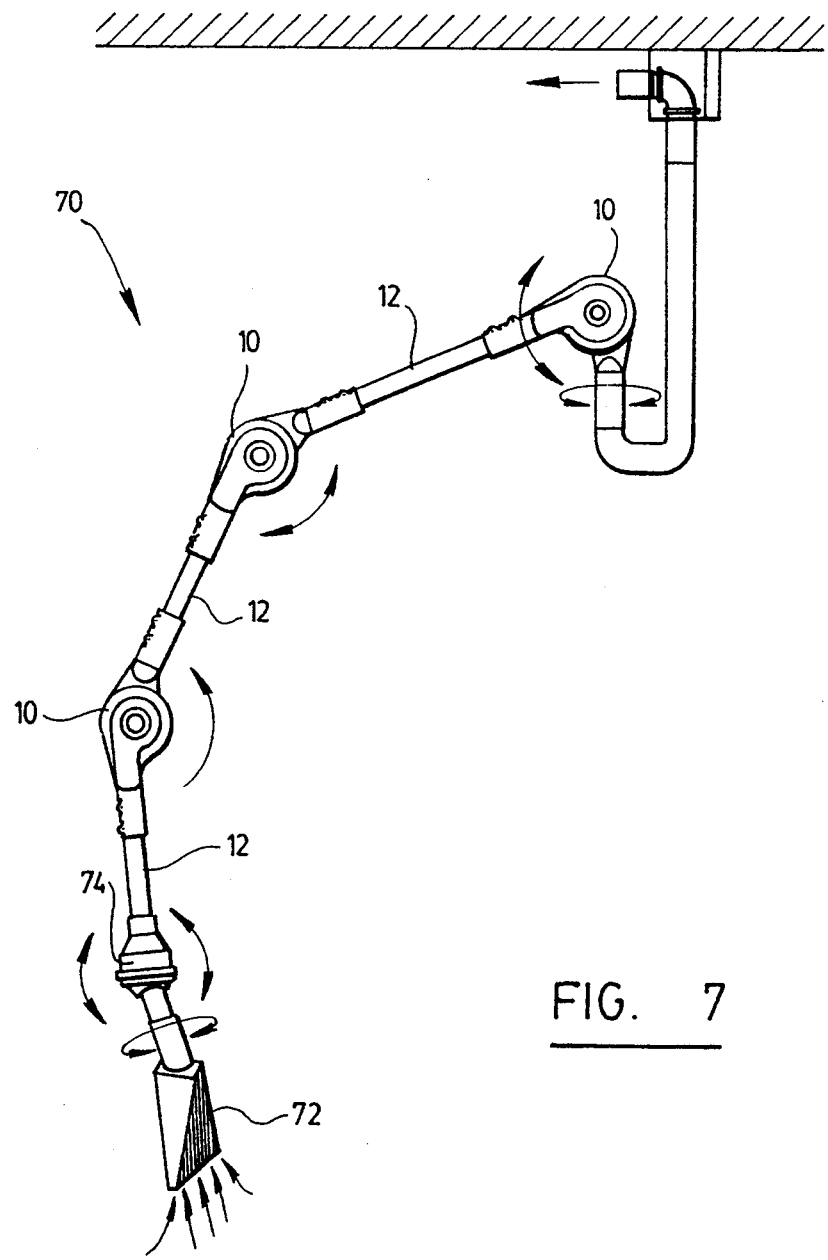
FIG. 7 is a side elevational view of a vacuum arm using couplings of FIGS. 1 and 2.

If desired, particularly for heavy loads that has to bear the coupling 10, it may be advantageous to provide a spiral spring 52 mounted around the axle 36, particularly between the casing 16 and the trust bearing 43, for instance. The spiral spring 52 is torsionally connected to the casing 16 and torsionally connected to the axle 36. This means that the spiral spring 52 is urging both of them into relative rotation. Since the spiral spring 52 is exerting a torque on the axle 36 and that the axle 36 is in return torsionally connected to the casing 14, the spiral spring 52 then generates a holding torque between both casings 14 and 16. For torsionally connecting the spiral spring 52 to the axle 36, as shown in FIG. 6, there may be provided a flat-edged section 39 of the axle 36 where the spiral spring 52, having a corresponding flat-sided hole 55, is mounted.

For torsionally connecting the spiral spring 52 to the casing 16, there may be provided a housing 54 enclosing the spiral spring 52. As shown in FIG. 1, the housing 54 has pegs 56 insertable inside corresponding holes 58 made on the periphery of the casing 16. That construction is particularly advantageous if it is possible to pull back the housing 54 by hand or with a tool until the pegs 56 are out of the holes 58 and where the spiral spring 52 is no longer torsionally connected to the axle 36, so that the stiffness of the spiral spring 52 can be modified by rotating it relatively to the casing 16.

As shown in FIG. 2, it is also possible to provide a torsion spring 60 withstanding a portion of the load. The spring 60 may be mounted inside the coupling 10, with one end resting on the casing 14 and another end resting on the casing 16.

The coupling 10 above-described is particularly well adapted for working under vacuum for carrying fluids, more particularly polluted air, although it may also be working under pressure or at ambient pressure. It may also be used only as the joint of a support or as a coupling for electric wire carrying conduits.

As shown in FIG. 6, couplings 10 may be provided on an aspiration arm 70. The couplings 10 can be easily adjusted even if the design of the arm 70 is complex, such as being provided with conduits 12 of different lengths. A suction hood 72 may be connected to a spherical joint 74 provided on the free end of the arm 70.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention. For instance, the elements that are related to the casing 14 in the description may be found on the casing 16 and vice versa.

What is claimed is:

1. An adjustable coupling for linking two conduits, said coupling comprising:
    a first and a second hollow casing, each having an open face comprising a substantially flat and circular edge, said edges being juxtaposed in a slip fitting contact for allowing relative rotation of said casings around a rotation axis;
    a friction disk provided between said edges;
    an alignment ring, said ring having one part insertable in a first circular slot provided on the edge of said first casing, and a second part insertable in a second circular slot provided on the edge of said second casing, said first and second slots facing each other;
    an axle substantially coinciding with said rotation axis, said axle being securable to said first casing for preventing relative rotation and axial inward movement thereof with reference to said first casing, said second casing having a hole through which a threaded free end of said axle projects;
    a trust bearing inserted around said free end of said axle;
    a helicoidal spring inserted around said free end of said axle;
    a nut in mesh with said free end of said axle and urging said spring and trust bearing towards the second casing, said nut being rotatable for modifying the friction of the contact between said edges;

connecting means for substantially laterally connecting said first and second casings to a corresponding conduit; and sealing means for hermetically sealing the interior of said coupling from ambient air.

2. A coupling according to claim 1, further comprising a torsion spring mounted around said axle and having a first end connected to said first casing and a second end connected to said second casing.

3. A coupling according to claim 1, further comprising a spiral spring mounted around said axle between said second casing and said trust bearing, said spiral spring being torsionally connected to said second casing and torsionally connected to said axle.

4. A coupling according to claim 1, wherein said nut is located at the bottom of a hand-operatable cup-shaped element, said element being inwardly mounted on said coupling for covering said spring.

5. An adjustable coupling for linking two conduits, said coupling comprising:

a first and a second hollow casing, each having an open face comprising a substantially flat and circular edge, said edges being juxtaposed in a slip fitting contact for allowing relative rotation of said casings around a rotation axis;

an axle substantially coinciding with said rotation axis, said axle being securable to said first casing for preventing relative rotation and axial inward movement thereof with reference to said first casing, said second casing having a hole through which a threaded free end of said axle projects;

a trust bearing inserted around said free end of said axle;

a helicoidal spring inserted around said free end of said axle;

an alignment ring, said ring having one part insertable in a first circular slot provided on the edge of said first casing, and a second part insertable in a second circular slot provided on the edge of said second casing, said first and second slots facing each other;

a nut in mesh with said free end of said axle and urging said spring and trust bearing towards the second casing, said nut being rotatable for modifying the friction of the contact between said edges; and connecting means for substantially laterally connecting said first and second casings to a corresponding conduit.

6. A coupling according to claim 5, further comprising a friction disk provided between said edges.

7. A coupling according to claim 5, wherein said nut is located at the bottom of a hand-operatable cup-shaped element, said element being inwardly mounted on said coupling for covering said spring.

8. A coupling according to claim 5, further comprising sealing means for hermetically sealing the interior of said coupling from ambient air.

9. An adjustable coupling for linking two conduits, said coupling comprising:

a first and a second hollow casing, each having an open face comprising a substantially flat and circular edge, said edges being juxtaposed in a slip fitting contact for allowing relative rotation of said casings around a rotation axis;

an axle substantially coinciding with said rotation axis, said axle being securable to said first casing for preventing relative rotation and axial inward movement thereof with reference to said first casing, said second casing having a hole through which a threaded free end of said axle projects;

a trust bearing inserted around said free end of said axle;

a helicoidal spring inserted around said free end of said axle;

a torsion spring mounted around said axle and having a first end connected to said first casing and a second end connected to said second casing;

a nut in mesh with said free end of said axle and urging said spring and trust bearing towards the second casing, said nut being rotatable for modifying the friction of the contact between said edges; and connecting means for substantially laterally connecting said first and second casings to a corresponding conduit.

10. A coupling according to claim 9, further comprising a friction disk provided between said edges.

11. A coupling according to claim 9, wherein said nut is located at the bottom of a hand-operatable cup-shaped element, said element being inwardly mounted on said coupling for covering said spring.

12. A coupling according to claim 9, further comprising sealing means for hermetically sealing the interior of said coupling from ambient air.

13. An adjustable coupling for linking two conduits, said coupling comprising:

a first and a second hollow casing, each having an open face comprising a substantially flat and circular edge, said edges being juxtaposed in a slip fitting contact for allowing relative rotation of said casings around a rotation axis;

an axle substantially coinciding with said rotation axis, said axle being securable to said first casing for preventing relative rotation and axial inward movement thereof with reference to said first casing, said second casing having a hole through which a threaded free end of said axle projects;

a trust bearing inserted around said free end of said axle;

a helicoidal spring inserted around said free end of said axle;

a spiral spring mounted around said axle between said second casing and said trust bearing, said spiral spring being torsionally connected to said second casing and torsionally connected to said axle;

a nut in mesh with said free end of said axle and urging said spring and trust bearing towards the second casing, said nut being rotatable for modifying the friction of the contact between said edges; and connecting means for substantially laterally connecting said first and second casings to a corresponding conduit.

14. A coupling according to claim 13, further comprising a friction disk provided between said edges.

15. A coupling according to claim 13, wherein said nut is located at the bottom of a hand-operatable cup-shaped element, said element being inwardly mounted on said coupling for covering said spring.

16. A coupling according to claim 13, further comprising sealing means for hermetically sealing the interior of said coupling from ambient air.

* * * * *